United States Patent [19]

Baldwin

[11] Patent Number: 4,634,045
[45] Date of Patent: Jan. 6, 1987

[54] DEWATERING SCREEN MANUFACTURE AND METHOD THEREOF

[76] Inventor: Alan D. Baldwin, 53 Melrose Avenue, Sylvania. N.S.W. 2224, Australia

[21] Appl. No.: 537,420

[22] Filed: Jan. 14, 1983

[86] PCT No.: PCT/AU83/00003
 § 371 Date: Sep. 19, 1983
 § 102(e) Date Sep. 19, 1983

[87] PCT Pub.No.: WO 83/02409
 PCT Pub. Date Jul. 21, 1983

[30] Foreign Application Priority Data

Jan. 19, 1982 [AU] Australia ............... 2343

[51] Int. Cl.⁴ .................. B01D 29/22; B23P 15/16
[52] U.S. Cl. .................. 228/212; 29/163.5 F; 228/904; 228/173.5; 140/92.2
[58] Field of Search .............. 228/212, 173 E, 178, 228/189, 49 R, 904; 140/92.1, 92.2; 269/48.1; 29/163.5 CW, 163.5 F

[56] References Cited

U.S. PATENT DOCUMENTS

| | | | |
|---|---|---|---|
| 1,976,522 | 10/1934 | Rose | 228/212 |
| 3,101,526 | 8/1963 | Paullus | 29/163.5 CW |
| 3,452,431 | 7/1969 | Hazel | 228/173 E |
| 3,667,615 | 6/1972 | Likness | 228/904 |
| 3,837,372 | 9/1974 | Bernot | 140/92.2 |
| 3,920,170 | 11/1975 | Colburn et al. | 29/163.5 CW |
| 4,045,853 | 9/1977 | White | 29/163.5 F |
| 4,337,932 | 7/1982 | Dennis et al. | 269/48.1 |
| 4,555,055 | 11/1985 | Connolly | 228/173.5 |

FOREIGN PATENT DOCUMENTS 2747148 4/1979 Fed. Rep. of Germany ... 228/173 E

Primary Examiner—Nicholas P. Godici
Assistant Examiner—Kurt Rowan
Attorney, Agent, or Firm—Oblon, Fisher, Spivak, McClelland & Maier

[57] ABSTRACT

A dewatering screen is manufactured by laying screen wires (40) in the parallel grooves (18) of a number of support members (13) so as to form a frusto-conical wire array. The support members (13) are movable inwardly to release the screen wire array, after the wire array has been bound by continuously welding a support rod (44) to the screen wires (40) as the support rod (44) is wrapped about the wire array.

7 Claims, 6 Drawing Figures

DEWATERING SCREEN MANUFACTURE AND METHOD THEREOF

TECHNICAL FIELD

This invention relates to the manufacture of screens, substantially frusto-conical in shape, for use in the dewatering of materials including coal, bauxite, and other minerals.

Known screens of this type comprise a plurality of screening wires forming a substantially frusto-conical surface. The screen is open at each axial end, and supported for rotation with its axis horizontal. Ore or other material enters the smaller end of the screen, and with rotation of the screen (typically 300 to 400 r.p.m.) water is removed through the gaps between the screening rods, and the ore or other material, in relatively dry condition, leaves the larger end of the screen.

BACKGROUND ART

A method presently utilised for the manufacture of such screens, involves the construction of a tubular cage of supporting rods, about which screening wires are wound and welded at their intersections with the support rods. The screen wires are of generally triangular cross section, with the apex of the wires contacting the support rods giving a line contact therewith suitable for electric welding.

In this prior art method, the welded tube is then split longitudinally and flattened, and cut into four trapezoidal sections and four rectangular sections. These sections are then rolled in the opposite direction so that the screening wires are then on the inside of the curved surface. The trapezoidal and rectangular sections are then welded along adjacent edges with the aid of interposed connecting strips to make an imperfect frusto-conical screen. Support rings are then welded at the ends of the screen.

This technique gives an adequate weld strength, which is necessary for the screen to have a life which is limited in most cases only by wear of the screening rods, but since the cross section of the screen insufficiently approaches that of a perfect frusto-conical surface, the screen is not perfectly balanced, leading to uneven wear resulting in premature failure of the basket, and wear on the bearings and associated machinery. Furthermore, this method of fabrication is very time consuming, and therefore very costly.

OBJECT OF THE INVENTION

An object of this invention is to provide apparatus for the manufacture of such dewatering screens, and a method of such manufacture, which will be more economical, and which will lead to a screen which more perfectly approaches a frusto-conical shape.

SUMMARY OF THE INVENTION

In one form, the present invention broadly comprises apparatus for the manufacture of a dewatering screen composed of a plurality of screen wires disposed on a frusto-conical surface and orientated in the axial direction of said surface, characterised in that said apparatus comprises a plurality of screen wire support members shaped to form when assembled together a frusto-conical surface, each support member comprising a plurality of parallel grooves dimensioned for the reception of the screen wires, said grooves being orientated in the axial direction of said surface. Preferably, the support members are mounted so as to be movable towards the axis of the frusto-conical surface thereby to disengage from the wires, and in the preferred embodiment of the invention, the support members are mounted for controlled movement between their retracted position and the position in which they form the frusto-conical surface.

In this way, the screen wires may be laid up to form the screen, by placing a screen wire in each groove of the support surfaces and then binding the wires in a cage by the application to the exterior of the array of wires, of a continuous support rod welded at its intersections with the screen wires.

In another broad form, the present invention therefore resides in a method of manufacturing a dewatering screen composed of a plurality of screen wires disposed on a frusto-conical surface and orientated in the axial direction of said surface, characterised by the steps of providing a plurality of screen wire support members defining a frusto-conical surface, each said support member comprising a plurality of parallel grooves dimensioned for the reception of said screen wires, laying said screen wires in said grooves to form a frusto-conical array, applying to said screen wires means to maintain them in the configuration determined by said grooves, and removing the support members from engagement with the screen wires.

The invention will now be described, by way of example only, in relation to a preferred embodiment.

BEST MODE FOR CARRYING OUT THE INVENTION

Figure 1:
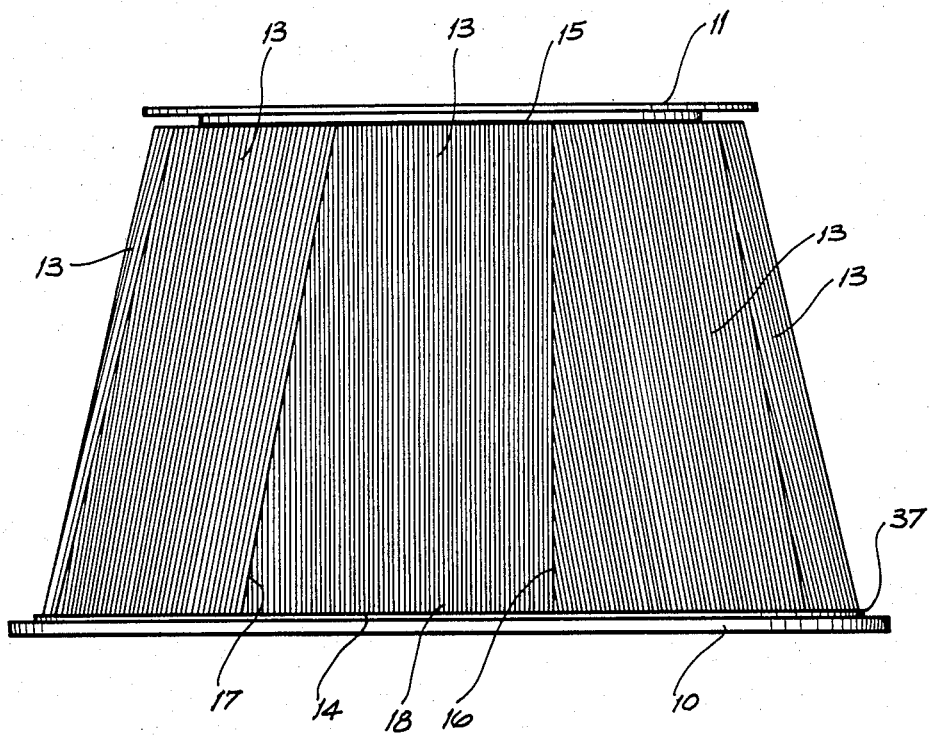
FIG. 1 is a side elevation of a jig embodying the present invention.
Figure 2:
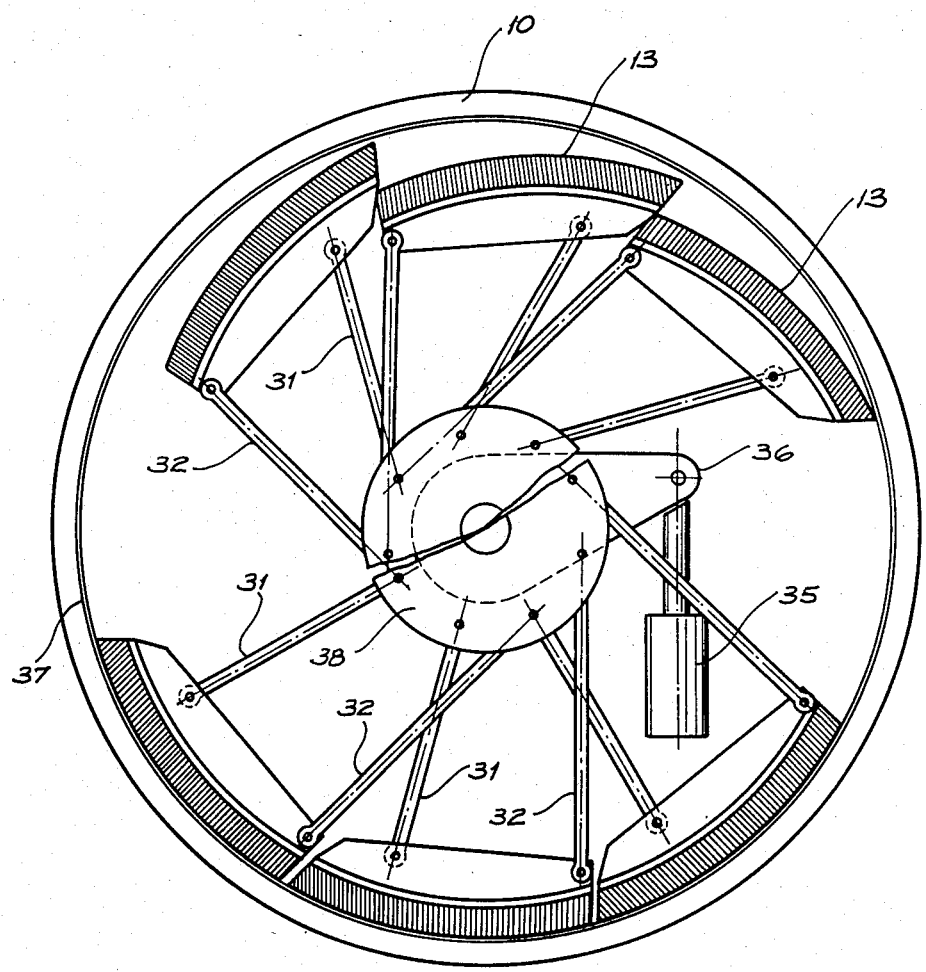
FIG. 2 is a plan view of the jig illustrated in FIG. 1 with the top plate removed and with some support members shown in retracted position.
Figure 3:
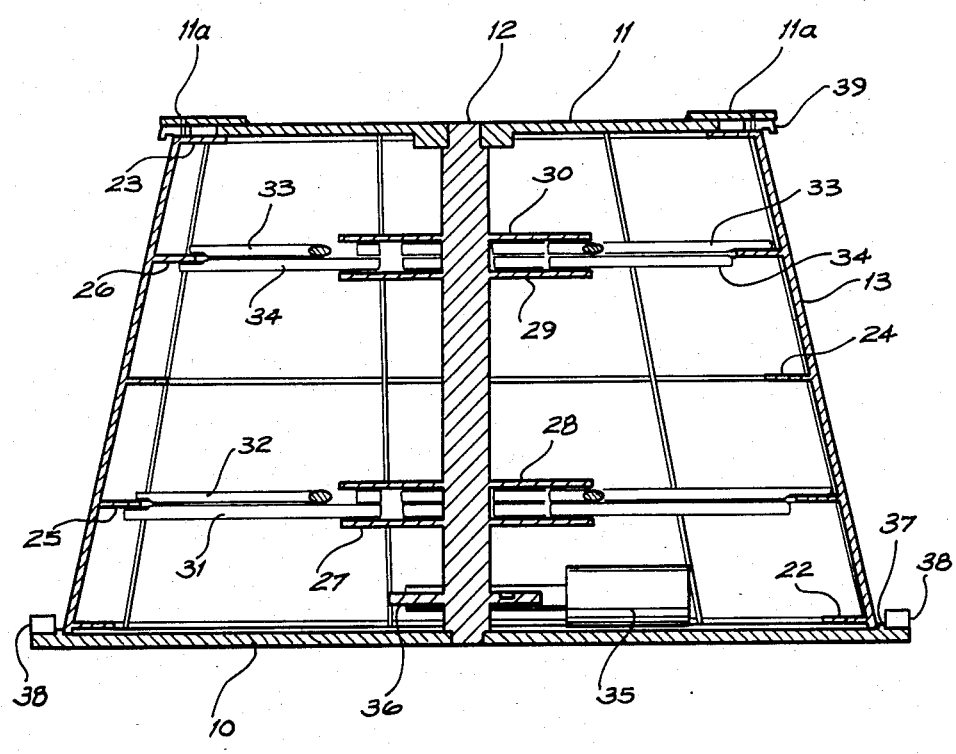
FIG. 3 shows the jig in a cross-section.

The jig illustrated in FIGS. 1, 2 and 3 comprises a base plate 10 and a top plate 11 between which is mounted for rotation, a central shaft 12.

Between the plates 10 and 11 and surrounding the shaft 12, are a number, in this embodiment 8, of support members 13 (in FIG. 2 two of these support members are deleted for the purpose of clarity). Each of these support members has lower and upper edges 14 and 15 respectively, these edges being parallel with the plates 10 and 11, a first side edge 16 which is at right angles to the upper and lower edges, and an oblique side edge 17.

On the outer surface of each support member 13 there are provided a plurality of parallel grooves 18, these grooves being parallel to the side edge 16. Each of the support members 13 is located on the jig so that the grooves 18 approximately in the centre of the support member at its upper edge 15, are coincident with a generatrix of the frusto-conical surface defined by the assembled members 13.

Figure 4:
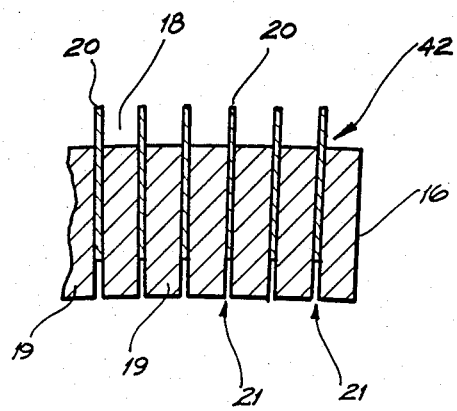
FIG. 4 is a fragmentary cross-section of a support plate.

FIG. 4, a fragmentary cross-section at the edge of a support member 13, shows one manner in which these support members may be constructed. In this form, the support member 13 comprises parallel steel bars 19, separated by shims 20, the shims extending beyond the surface formed by the outer edges of the bars 19, to form the grooves 18. The assembly of bars 19 and shims 20 may be held together by a number of bolts (not shown) passing through the assembly across the width of the support member 13.

A particular advantage of the construction illustrated in FIG. 4 is derived from the fact that the location of the shims leads to the provision of narrow grooves 21 between the inner portions of the bars 19. This facilitates the bending of the support member 13 out of the planar condition in which it is initially assembled, to conform to the frusto-conical shape required.

The support members 13 are completed by the provision, suitably by welding, of stiffening flanges to the inner surface, these flanges comprising lower and upper flanges 22 and 23, a central flange 24, and intermediate flanges 25 and 26.

The shaft 12 is also provided with flanges, comprising a lower pair of flanges 27 and 28 and an upper pair of flanges 29 and 30. Extending between the lower flanges 27 and 28, and each flange 25, are respective links 31 and 32 which are pivotally attached at spaced positions to the flanges 25 of respective support members 13. In a similar manner, particularly as shown in FIG. 2, links 33 and 34 connect the upper shaft flanges 29 and 30 with the intermediate support member flanges 26.

The arrangement of the links 31 and 32 and 33 and 34, as shown in FIG. 2 (where only the lower links 31 and 32 are shown for purposes of clarity) is such that upon rotation of the shaft 12 relative to the remainder of the jig, the support members 13 will be drawn inwardly and pivotally, from the position of the three members shown in the lower portion of FIG. 2, to the retracted position shown by the three upper members as seen in FIG. 2. For the purposes of illustration, it will be seen that the jig in FIG. 2 is shown in a split condition, although of course the support members 13 move as a whole between their extended and retracted positions.

Rotation of the shaft 12 is produced by means of a hydraulic ram 35 and a crank 36 extending from the shaft 12.

The support members 13 are supported on the base plate 10, which is provided with an integral locating ring 37 against which the support members 13 rest when in their unretracted position. The base plate 10 extends beyond the ring 37 to provide a supporting surface on which may be mounted a screen end ring 38 (FIG. 3).

Attached to the outer periphery of the top plate 11 is a top plate ring 11a, spaced above the upper flanges 23 of the support members 13, for the location therebetween of a screen end ring 39.

Figure 6:
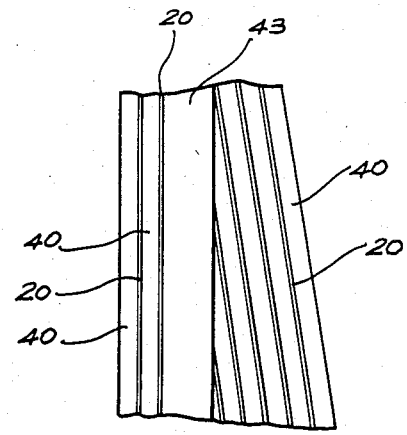
FIG. 6 is a fragmentary elevation of a screen manufactured according to the present invention.

The apparatus so far described is employed in the manufacture of a dewatering screen of the type described above, as follows. The jig is assembled by placing the support members 13 in their outermost position to define the frusto-conical surface. Screen wire 40, preferably of known wedge-wire cross-section and preferably of stainless steel, is then cut to appropriate lengths which are placed within the grooves 18. Along the oblique edge 17 of each support member, it will be appreciated that the screen wire 40 is cut so that it does not protrude beyond the edge of the support member. Lengths of screen wire 40 are laid in all grooves 18. As will be seen in FIG. 4, the bar 19 and shim 20 at the edge 16 of each support member 13 form an open region 42, and no screen wire 40 is placed in this region. Instead, in the course of assembly of the screen wire array, connecting strips 43 of stainless steel bar are placed in the open regions 42, between the shim 20 nearest the edge 16, and the free ends of the screen wires 40 at the oblique edge 17 of the adjacent support member 13, the connecting strips covering the gap between the juxtaposed edges 16 and 17. The fragmentary view in FIG. 6 shows the relationship between these elements.

Figure 5:
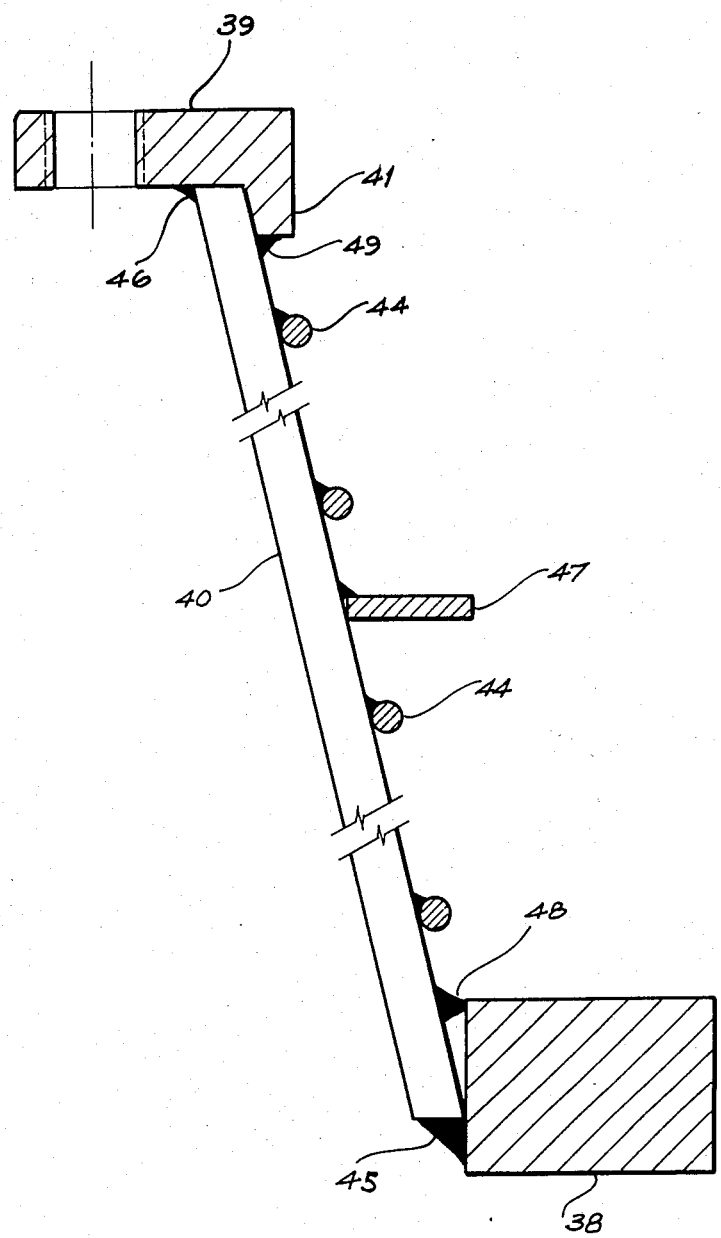
FIG. 5 is a fragmentary cross-section showing the relationship between components of a screen manufactured according to the present invention.

The end ring 39, which has been bolted to the top plate ring 11a, is then lowered over the upper ends of the screen wires 40 and the connecting strips 43. As FIG. 5 shows, the end ring 39 is provided with a downwardly extending flange 41 behind which the upper end of the screen wire 40 is located. The top plate 11 is then fixed in position, by bolting to support columns (not shown) which extend from the base plate 10 within the jig, thereby maintaining the symmetry and tolerance between the end rings 38 and 39.

The end ring 38 is now lowered over the jig clamped to the bottom plate 10, and welded to the lower ends of the screen wires 40 and connecting strips 43, at 45 as shown in FIG. 5.

As in prior art screens of this general type, the screen wire 40 is bound by an external support rod 44, laid over the screen wires and welded to the screen wires at each point of overlap therewith. As will now be appreciated, however, whereas in the prior art techniques the support rod and screen wire were welded in sections which subsequently required attachment at the connecting strips, the support rod 44, by the use of the present invention, can be applied continuously and circumferentially of the screen. This may be achieved by drawing a continuous support rod onto the jig by rotating the entire assembly, so that the support rod wraps in helical fashion around the exposed outer surfaces of the screen wires 40, and simultaneously, preferably by means of metal-inert gas welding, welding the support rod to the screen wires at each intersection. The screen wires are of course very closely spaced, and this welding is a continuous operation as the jig is rotated, and may be carried out automatically by means of a welding head which moves upwardly and parallel to the frusto-conical array of screen wires. It will be appreciated, of course, that the support rods are, in this process, welded across the connecting strips 43 as well.

After the application of the support rod 44 the upper ends of the screen wires 40 and the connecting strips 43 are welded to the end ring 39 at 46, and at this stage the screen is ready for removal from the jig. Removal is achieved by operating the ram 35 to retract simultaneously each of the support members 13. The action of the crank formed by the flanges 27 to 30 and the links 31 to 34 is such that the support members are, in effect, "peeled" away from the screen wires in a continuous movement from one edge of the support member to the other.

With the retraction of the support members 13, the top plate 11 can be removed, lifting the screen assembly from the jig, which may then be readied for the production of the next screen.

If desired, either while the screen assembly is in situ on the jig or after its removal from the jig, a stiffening ring or rings 47 may be provided, again by welding at the junction of the ring with the screen wire 40.

After removal from the jig, the attachment of the screen wire 40 to the end rings 38 and 39 is completed by the addition of further welds 48 and 49, respectively. Manufacture of the screen is now complete, although it may be necessary to add balance weights to the end rings in order that the screen will be accurately dynamically balanced.

It will be appreciated from the aforegoing description that the screen produced by the method and using the apparatus described is of much greater inherent strength than screens manufactured by prior art techniques. A further advantage of the invention is that no bending of the screen wire 40 is required in the construction of the screen, and consequently screen wire of considerably greater hardness may be employed in comparison with the prior art.

The ability to use M16 welding (rather than resistance welding as in the prior art) avoids loss of hardness through heating of the screen wire.

The combination of greater screen wire hardness, greater inherent strength and better balance leads to a very substantial increase in the life of the screen produced by the present invention. It will also be appreciated from the foregoing description that the labour content in the manufacture of screens in accordance with the present invention is considerably reduced in relation to the prior art, so that screens of the present invention may be produced at reduced cost.

While the invention has been described in relation to a particular embodiment for the purposes of illustration, it will be appreciated that the invention lies in the general principles exemplified, and is not to be regarded as restricted by the particularity of the foregoing description.

I claim:

1. Apparatus for the manufacture of a dewatering screen composed of a plurality of screen wires disposed on a frusto-conical surface and oriented in the axial direction of said surface, said apparatus comprising a plurality of screen wire support members shaped to form upon assembly a frusto-conical surface, each one of said plurality of screen wire support members having:
   (a) a plurality of parallel grooves dimensioned for the reception of the screen wires, said plurality of parallel grooves being oriented in the axial direction of the frusto-conical surface;
   (b) a pair of end edges at least substantially normal to the axial direction of the frusto-conical surface; and
   (c) a pair of side edges, a first one of said pair of side edges being parallel to said plurality of parallel grooves and a second one of said pair of side edges tapering towards said first edge in the direction of the apex of the frusto-conical surface.

2. Apparatus according to claim 1 wherein said plurality of parallel grooves in each of said plurality of screen wire support members in a central region thereof is disposed substantially parallel to a generatrix of the frusto-conical surface.

3. Apparatus for the manufacture of a dewatering screen composed of a plurality of screen wires disposed on a frusto-conical surface and oriented in the axial direction of said surface, said apparatus comprising a plurality of screen wire support members shaped to form upon assembly a frusto-conical surface, each one of said plurality of screen wire support members:
   (a) having a plurality of parallel grooves dimensioned for the reception of the screen wires, said plurality of parallel grooves being oriented in the axial direction of the frusto-conical surface, and
   (b) comprising a plurality of first parallel members separated by second parallel members, the sides of each one of said plurality of parallel grooves being defined by two adjacent ones of said second parallel members and the base of each one of said plurality of parallel grooves being defined by one of said first parallel members.

4. Apparatus according to claim 3 wherein said plurality of first members extend toward the axis of the frusto-conical surface to a greater extent than said second members to form grooves between said first members on the inner surface of said screen wire support members, thereby facilitating the adoption by each one of said plurality of screen wire support members of a curved profile to enable each one of said plurality of screen wire support members to form part of the frusto-conical surface.

5. Apparatus for the manufacture of a dewatering screen composed of a plurality of screen wires disposed on a frusto-conical surface and oriented in the axial direction of said surface, said apparatus comprising a plurality of screen wire support members shaped to form upon assembly a frusto-conical surface, each one of said plurality of screen wire support members:
   (a) having a plurality of parallel grooves dimensioned for the reception of the screen wires, said plurality of parallel grooves being oriented in the axial direction of the frusto-conical surface, and
   (b) being mounted so as to be movable toward the axis of the frusto-conical surface, thereby to disengage from the screen wires.

6. Apparatus according to claim 5 and further comprising means for controlling the movement of each one of said screen wire support members between a first position in which said screen wire support members define the frusto-conical surface and a second position inwardly of said first position.

7. Apparatus according to claim 6 wherein said means comprise links connecting each one of said screen wire support members to a crank means rotated by a shaft mounted axially of the frusto-conical surface.

* * * * *